United States Patent [19]
Freeport et al.

[11] Patent Number: 5,585,127
[45] Date of Patent: Dec. 17, 1996

[54] COMPOSITION AND METHOD FOR FLAVORING POPPED POPCORN

[75] Inventors: Dana S. Freeport, St. Louis Park; Charles H. Turpin, Minneapolis, both of Minn.

[73] Assignee: Golden Valley Microwave Foods, Inc., Edina, Minn.

[21] Appl. No.: 397,481

[22] Filed: Mar. 2, 1995

[51] Int. Cl.$^6$ .................................................... A23L 1/18
[52] U.S. Cl. ........................... 426/93; 426/96; 426/302; 426/303; 426/305; 426/309; 426/573; 426/650
[58] Field of Search .................... 426/93, 96, 302, 426/303, 305, 309, 573, 650

[56] References Cited

U.S. PATENT DOCUMENTS

| | | |
|---|---|---|
| 1,658,486 | 2/1928 | Howe . |
| 1,969,730 | 8/1934 | Daughters . |
| 2,222,560 | 11/1940 | Clickner . |
| 2,240,759 | 5/1941 | Chandler . |
| 2,475,133 | 7/1949 | Furter et al. . |
| 2,518,247 | 8/1950 | Nairn . |
| 2,604,407 | 7/1952 | Martin . |
| 2,648,610 | 8/1953 | Martin . |
| 2,673,806 | 3/1954 | Colman . |
| 2,702,246 | 2/1955 | Kinsell . |
| 2,843,080 | 7/1958 | Woodruff . |
| 3,102,032 | 8/1963 | Lippert . |
| 3,140,952 | 7/1964 | Cretors . |
| 3,341,331 | 9/1967 | Kimura et al. . |
| 3,341,336 | 9/1967 | Jokay . |
| 3,556,815 | 1/1971 | Fujiwara . |
| 3,580,727 | 5/1971 | Gulstad . |
| 3,617,309 | 11/1971 | Rebane . |
| 3,689,291 | 9/1972 | Draper . |
| 3,704,133 | 11/1972 | Kracauer . |
| 3,783,820 | 1/1974 | Hautly et al. . |
| 3,830,941 | 8/1974 | Luft et al. . |
| 3,843,814 | 10/1974 | Grunewald-Kirstein . |
| 3,851,081 | 1/1974 | Epstein . |
| 3,851,574 | 12/1974 | Katz et al. . |
| 3,882,255 | 5/1975 | Gorham, Jr. et al. . |
| 3,961,091 | 6/1976 | Caccavale et al. . |
| 3,973,045 | 8/1976 | Brandberg et al. . |
| 4,038,425 | 7/1977 | Brandberg et al. . |
| 4,053,650 | 10/1977 | Chino et al. . |
| 4,096,281 | 6/1978 | Young et al. . |
| 4,156,742 | 5/1979 | Babcock et al. . |
| 4,163,066 | 7/1979 | Mason et al. . |
| 4,219,573 | 8/1980 | Borek . |
| 4,409,250 | 10/1983 | Van Hulle et al. . |
| 4,563,366 | 1/1986 | Baird et al. . |
| 4,640,842 | 2/1987 | May . |
| 4,767,635 | 8/1988 | Merritt et al. . |
| 4,849,233 | 7/1989 | Hemker ..................................... 426/93 |
| 4,880,646 | 11/1989 | Lew et al. . |
| 4,956,193 | 9/1990 | Cain et al. . |
| 4,981,707 | 1/1991 | Morris ..................................... 426/93 |
| 5,002,785 | 3/1991 | Lew . |
| 5,069,923 | 12/1991 | Hubbard et al. . |
| 5,108,772 | 4/1992 | Wilbur . |
| 5,132,125 | 7/1992 | Lew et al. . |
| 5,215,770 | 6/1993 | Aramouni . |
| 5,284,666 | 1/1994 | Graf . |

FOREIGN PATENT DOCUMENTS

| | | |
|---|---|---|
| 2680082 | 12/1993 | France . |
| 3335781 | 11/1985 | Germany . |
| 62-244360 | 10/1987 | Japan . |
| 102445 | 1/1989 | Japan . |

OTHER PUBLICATIONS

Iglesias et al., *Handbook of Food Isotherms: Water Sorption Parameters for Food and Food Components*, Academic Press Inc, New York, NY, at pages 86, 224, and 225 (1982) (no month/day indicated on copy of reference).

Minifie, "Physical 1Structure of the Confection", *Chocolate, Cocoa and Confectionery: Science and Technology*, The AVI Publishing Company, Inc., Westport, CT, at page 464 (1980) (no month/day indicated on copy of reference).

*Primary Examiner*—Helen Pratt
*Attorney, Agent, or Firm*—Merchant, Gould, Smith, Edell, Welter & Schmidt, P.A.

[57] ABSTRACT

A flavored, aqueous-based, adhesive composition containing no added fat or oil is sprayed onto popped popcorn, then a dry flavorant is applied, and the popcorn dried of excess moisture.

8 Claims, No Drawings

COMPOSITION AND METHOD FOR FLAVORING POPPED POPCORN

FIELD OF THE INVENTION

The present invention relates to compositions and methods for flavoring popcorn. Methods described herein can be used to prepare flavored kernels which can be popped by such methods as microwave popping, to generate flavored popcorn product. Certain methods and compositions described herein can be applied to already popped popcorn, to generate a flavored "prepopped" product. Various popcorn products are also provided.

BACKGROUND OF THE INVENTION

The present disclosure relates to popcorn flavoring. In general, it relates to two applications of flavoring. The first will be referred to generally as flavoring of "prepopped" popcorn. The second will be generally referred to as flavoring of microwavable popcorn compositions.

I. Flavoring of Prepopped Popcorn

A variety of consumer popcorn products are generally referred to as "prepopped" products. These are popcorn products which are popped before they are obtained by the consumer for consumption. For example, such products include bags or canisters of already popped popcorn.

In general, prepopped consumer popcorn products are provided with a variety of flavorings. These include, for example: butter/salt flavoring; cheese flavoring; and, sweet flavorings such as caramel.

Conventional approaches to flavoring prepopped popcorn have often been developed based on a belief that application of flavoring through the utilization of aqueous-based materials is to be avoided. A reason for this has been industry observations that application of water undesirably affects the popcorn. In particular, popped popcorn flakes readily become soggy when they encounter water.

In some instances, flavored prepopped popcorn has been generated by including flavorant in the oil/fat in which the popcorn is prepared. For example, butter/salt flavorings are sometimes provided in oil/fat in which the popcorn is cooked. Relatively recently, however, consumer concerns with respect to preparation of popcorn utilizing substantial amounts of added oil or fat have been of concern. It has been preferred, therefore, to attempt flavoring approaches which do not involve the use of added oil/fat to any substantial degree.

Other methods by which prepopped popcorn has been flavored involve the addition of flavorings in nonaqueous-based application solutions. For example, alcohol-based or oil-based systems have been used. These require the utilization of substantial amounts of organic solvents, and processing techniques for removal of the solvent vapors. In addition, they are relatively expensive, due to the costs associated with procuring and removing the organic solvents.

II. Flavored, Unpopped Popcorn Products

Freshly popped popcorn is also a popular consumer item. Such products are typically popcorn sold in the form of unpopped kernels, which are popped by the consumer.

In general, there have been developed two principal methods of flavoring such popcorn. The first is the addition of flavoring after the popcorn is popped. For example, consumers often add butter and salt to freshly popped popcorn to provide desirable flavor, aroma or color.

A second method is to provide flavorings or other materials mixed with the unpopped kernels, so that during the popping process the kernels are provided with flavor (or color, etc.). Such methods typically require control of the components in the flavoring mixture, to avoid undesirable burning or scorching during the popping process.

In general, techniques for providing flavorings mixed with the popcorn (prior to popping) have developed in part with specific focus on the method to be utilized by the consumer to cause popping. That is, the demands of the environments provided by alternate methods of popping, such as hot-air poppers, conventional heated popcorn poppers with oil/fat, or microwave systems, have to some extent dictated different needs or requirements in the flavoring compositions.

In some conventional popcorn poppers, flavorings are mixed in with oil/fat used during the popping process. During the popping process, the oil/fat will tend to splash over the popping popcorn, spreading the flavoring over the popped popcorn. In some systems, this has been a particularly convenient method for providing butter/salt flavoring to the popcorn.

Some conventional microwave popcorn systems have utilized similar principles. That is, the popcorn is packaged with a salt flavoring that is mixed with an added oil/fat material. When the package is placed in a microwave oven, the popcorn is popped in the presence of the oil/fat and the flavoring is distributed over the popcorn. Such a system is described, for example, in U.S. Pat. No. 3,704,133, the disclosure of which is incorporated herein by reference. A system which utilizes a film former in conjunction with an oil/fat to coat the popped popcorn with a flavoring material is described in U.S. Pat. No. 3,851,574, incorporated herein by reference.

In recent years, consumer focus has turned to preferences for "light", "low fat", "no fat" or similar food products. In many instances, consumers prefer to prepare their foods by means other than through the utilization of substantial amounts of oil/fat in the preparation process. Hot-air poppers, which do not utilize substantial amounts of oil/fat in the popping process, have enjoyed some popularity. However, in general, the provision of flavorings during the popping process, rather than added after the popping process, has been a problem.

One method developed to approach this is presented in U.S. Pat. No. 4,767,635, the disclosure of which is incorporated herein by reference. According to that disclosure, the unpopped kernels are provided with a film or coating having some flavoring material retained therein. According to the reference, during a popping process, a portion of the film retains some of the flavoring on residual hulls of the kernels.

With respect to microwavable popcorn products, Golden Valley Microwave Foods, the assignee of the present application, has developed systems for providing flavored microwavable popcorn kernels, and ultimately a microwave popped flavored popcorn product, in the absence of added oil/fat. Techniques with respect to this are described in U.S. Ser. No. 08/198,892, now abandoned, the disclosure of which is incorporated herein by reference. Further descriptions of the products from such processing are described in U.S. application Ser. No. 08/391,437, filed Feb. 21, 1995, also owned by Golden Valley Microwave Foods and incorporated herein by reference. That application was filed identifying Dana S. Freeport as the inventor, and has the title: COMPOSITION AND METHOD FOR FLAVORING POPCORN; AND PRODUCT. Golden Valley Microwave Foods has marketed such a product under the name "ACT II® 96% Fat-Free Popcorn". The products generally comprise coated kernels of popcorn, which are popped in a microwave bag construction, to generate a flavored popped popcorn product.

SUMMARY OF THE INVENTION

According to the present invention a method of applying a flavoring composition to flakes of prepopped popcorn is provided. The method generally includes steps of applying an aqueous-based adhesive composition to the flakes of prepopped popcorn; and, after the step of applying aqueous-based adhesive composition, applying dry flavorant composition to the flakes of popcorn. Following this, a step of drying is conducted, to avoid undesired loss of crispness due to excess moisture. Preferably the method of applying the adhesive composition comprises applying the composition as a fine mist.

In preferred applications, the adhesive composition contains about 0.5–15% by weight adhesive. The amount, however, will be varied depending upon the particular adhesive used. Preferred ones are identified herein.

In general the step of spraying the adhesive composition onto the flakes comprises applying about 1–10% by weight adhesive composition, per weight of popped flakes. In certain preferred applications, about 4–6% by weight is applied.

Preferably the dry flavorant composition comprises a material sized to 50–250 mesh (U.S. Standard).

Also according to the present invention, a method of applying a flavoring composition to kernels of unpopped popcorn, which can be popped in a microwave oven, is provided. The method in general comprises steps of applying an aqueous-based adhesive composition onto unpopped kernels of popcorn, the aqueous-based adhesive composition including a flavoring adhesive effective amount of an adhesive gum. In certain preferred applications, the step of applying comprises applying no more than about 2%, and typically no more than 1.4%, by weight, adhesive composition, per weight popcorn kernels. In general the method includes a step of applying dry flavorant composition to the kernels, after they have been coated with the adhesive composition. The method then generally concerns a step of drying the moisture from the pieces of popcorn.

With respect to the application to unpopped kernels, preferably the step of applying comprises applying no more than about 1.4% (and preferably about 0.5–1.2%) by weight adhesive composition, based on the weight of kernels. Also preferably for application to unpopped kernels, the adhesive composition contains no more than about 15% by weight adhesive, with a specific amount being variable depending upon the particular adhesive chosen.

Also, according to the present invention a prepopped popcorn product comprising a result of applying flavorant in preferred manner to prepopped popcorn flakes is provided. Further, an unpopped popcorn product comprising coated kernels which can be popped conveniently, for example in a microwave popping process, is provided.

Further, in general, techniques are described herein for preparing flavored consumer products and for preparing products for ultimate ingestion, according to the techniques described.

DETAILED DESCRIPTION OF THE INVENTION

As indicated above, the principles disclosed herein concern the preparation of flavored, prepopped popcorn products as well as flavored kernels from which freshly popped popcorn can be made. While techniques according to the present invention, when applied in the different circumstances, can be similar, the two types of products and techniques specifically related to them will be described separately. In part, this is because the different applications have different needs and requirements.

I. Flavored, Prepopped Popcorn Products

In general, this application of the techniques described herein concerns first preparing popped popcorn, and then applying flavoring thereto. The techniques are particularly adapted to the provision of "low fat" or "low added fat" systems or systems in which the popcorn is at least not popped in an oil/fat mixture. Popcorn generally inherently includes about 4% by weight fat, and the techniques described herein do not affect that content. In addition, it is noted that some flavorants include some amounts of oil/fat therein. However, the flavorants are generally utilized in such small amounts that the overall fat content of the product is not substantially affected by the flavorant. Oil/fat added as a result of the flavorant chosen are generally disregarded in the descriptions of the techniques presented herein.

A. Obtaining the Prepopped Popcorn

In general, it is desired to flavor popcorn which has been popped in the absence of oil/fat. In large volume, for prepopped, packaged, consumer products, such popcorn can be obtained through the utilization of conventional hot-air poppers and conventional hot air popping methods. The popcorn typically used will be from kernels having: yellow color; approximately 65 kernels/10 gram; and a moisture of 14% by weight (13.7%–14.3%); and, which is popped to an expansion density of about 39:1 to 43:1 (ratio of pop volume to unpopped volume). Before application of coating compositions to the popped popcorn according to the present techniques, fines and unpopped kernels should preferably be sifted away from the prepopped flakes of popcorn. For preferred application of adhesive and flavoring, the prepopped flakes would be transferred to a pan-type coater.

B. Application of the Flavoring to the Popped Popcorn

According to the techniques of the present invention, an aqueous-based adhesive composition or tackifying composition is applied to the popped popcorn. After the adhesive composition is provided on the popcorn, flavorant and, optionally, various adjuvants are added as a dry mixture.

1. Preparation of the Adhesive Composition

The adhesive composition is preferably applied in the form of an aqueous-based composition. The composition is sometimes referred to as a "tacking" or "tackifying" composition. The composition is preferably a solution, rather than a suspension. Although the solution is aqueous-based, preferably it includes only about a sufficient amount of moisture (water) for convenient application and spread over the popped flakes. Also, an effective amount of the adhesive (or tacking agent) to adhere the added flavorant to the popcorn, for delivery of flavor to the consumer, should be applied (i.e. a flavoring adhesive effective amount). Preferably the applied composition contains about 0.5–15% by weight tacking agent or adhesive, the remainder preferably being water (or in some instances also adjuvant as described). The ratio (by weight) of the tacking agent or adhesive applied, to the dry flavoring or seasoning blend later applied, is preferably between 0.2:1 and 1:1. The total weight of adhesive composition applied will preferably be about 1% to 10%, by weight, (more preferably 4–6%) of the weight of the popped popcorn.

A variety of tacking agents or adhesives may be used. Preferred materials usable as the tacking agent comprise bacterial polysaccharide gums such as gellan gum, xanthan gum, gum arabic, and cellulose gum or mixtures thereof. By "bacterial" in this context, it is meant that the gum comprises a product of a microorganism's operation on a fermentation medium. For example, gellan gum is produced by the microorganism *Pseudomonas elodea* (ATCC 31461). Xanthan gum comprises the fermentation product of *Xanthomonas campestris*. Gum arabic, also known as Gum acacia, is the dried gummy exudate from stems and branches of *Acacia senegal* (Linne), *willdenow* or other related African species of acacia. A useable cellulose gum is sodium carboxymethyl cellulose.

The presently preferred gum is gellan gum. A particular preferred gellan gum for utilization in coating compositions for prepopped popcorn is available under the trade designation K3B408, from the Kelco Division of Merck & Co., Inc., San Diego, Calif. 92193. K3B408 is a blend of gellan gum and sodium citrate. The sodium citrate facilitates the hydration of gellan gum at ambient temperatures (60°–70° F.) in tap water; thus the sodium citrate helps dispersion of the gum in tap water.

Another preferred gum for utilization in compositions for application to prepopped popcorn is a blend of maltodextin, corn syrup solids, gum acaia, and cellulose gum (the commercial product being TIC Gums No-Fat Snack Blend, available from TIC Gums, Inc. of Belcom, Md.). In certain preferred compositions, as exemplified below, mixtures of commercial K3B408 gellan gum and the commercial TIC Gums No-Fat Snack Blend will be desired.

In general, the K3B408 and the TIC material are preferred to other commercial gum materials due to the ease with which they can be solubilized in water at ambient temperatures and also because low usage levels are possible (for example, K3B408 can be used at levels of 0.1–1% based on wt. of tacking composition and TIC No-Fat at levels of 7–15% based on wt. of tacking composition).

In part because of the methods of application desired, it is preferred that the tackifying agents or adhesives used in adhesive compositions according to the present invention are ones which are soluble in water; and, it is preferred that the adhesive compositions be prepared as solutions, i.e. with the gum(s) fully dissolved. It is also preferred that the solubility be such that at least about 0.5 g to 15 g of gum can be readily dissolved per 100 ml of water (at ambient). Usable, commercially available, gums which satisfy this requirement include the following:

Kelcogel K3B408; from Kelco Division of Merck & Co., Inc., San Diego, Calif. 92193

TIC Gums No-Fat Snack Blend; from TIC Gums, Inc., Belcom, Md. 21017-0369

Gum Arabic, NF Premium, spray dried Type A-180; from Gumix International, Fort Lee, N.J. 07024-7552

Keltrol GM, Xanthan gum; from Kelco Division of Merck & Co., Inc., San Diego, Calif. 92193

Methocel (A4MP or K4MP) Cellulose Gum; from Dow Chemical, Midland, Mich. 48674.

The adhesive compositions can be prepared by mixture at ambient temperature. They may optionally include some flavoring and/or coloring (or other adjuvants). However, as indicated previously, it is preferred that the adhesive compositions comprise solutions. Thus, any flavoring and/or coloring (or other adjuvants) provided should be in solution. In general, if flavorant or other adjuvant is included in the tacking solution, it will be preferred not to include more flavoring/coloring or other adjuvants than will fully dissolve in the amount of moisture needed to provide the adhesive in a solution form and to effectively coat the popped popcorn flakes. Preferably any dissolved flavorant and/or other adjuvant is at a level of about 0.1–2.0%, by weight in the adhesive solution.

Generally, when flavorants and/or other adjuvants are put in the adhesive solution, it is to enhance the performance of later added flavor, for example salt. Applying some flavorings and adjuvants in the adhesive solution may improve the uniformity of the distribution of flavor.

2. Application of the Tacking Composition to the Popped Popcorn

Preferably the tacking solution is applied to the popped popcorn as a fine mist. A variety of techniques may be utilized to generate the fine mist applied to the popcorn. A device such as a Wagner Heavy Duty Power Painter (from Wagner Tool), for example, which is capable of being set to generate a relatively fine spray mist, can be used. By "fine mist" it is meant that the spray is of droplets and is not a continuous water stream.

With respect to application techniques, the following factors have been observed to be of interest, at least in part, to obtaining a desirable flavored prepopped product:

(a) Amount of water (or tacking composition) applied per weight of popped popcorn;

(b) Amount of adhesive applied per weight of popped popcorn;

(c) Rate of drying of moisture from the prepopped flakes, after application of the adhesive composition.

In general, success in developing a well or fully flavored prepopped popcorn product according to the present invention has been obtained when the amount of adhesive composition added to the flakes by misting, is about 1–10% of the weight of the popped flakes. In general, undesired levels of sogginess are achieved with additions of greater than about 10%. While the amount of moisture that can tolerated will vary depending upon the particular application technique used, and the rate of drying involved, in general addition of about 4–6% of mist, per weight popcorn, with relatively even distribution, is preferred.

The amount adhesive agent that should be applied may vary depending upon the particular adhesive chosen. However, in general, success has been obtained with application of about 15–150 grams of adhesive composition (including water weight) per 1500 grams popcorn. Amounts which are substantially lower may lead to insufficient adhesive for desirable retention of flavorant during the next step. Larger amounts of adhesive may simply require sufficient amounts of moisture and sufficiently long application times, that undesirable water logging of the flakes occurs.

Preferred methods and rates of drying are described in a further section below.

C. Application of Flavoring and/or Coloring (or Other Adjuvants)

Flavoring and/or coloring (other than any that may have been included in the mist) is added as a dry blend. Preferably it is sifted onto the popped flakes immediately after the tacking solution has been applied to the popped flakes, and before the surfaces of the popped flakes are completely dried. Fine powders are preferred, for the dried blend, for even distribution of color and/or flavor over the uneven surfaces of the popped flakes. Thus, preferably dry mixes that are sifted to 50–240 (or 50–250) mesh (U.S. Standard Mesh) are used. By this is meant that the particles are generally smaller than 50 mesh and greater than about 240 or 250 mesh.

In general, spray dried and dry encapsulated flavors are preferred, so the flavorant itself can be blended and applied directly to the surface of the flake where it will yield the highest impact.

If the selected flavoring is to include salt, in general it is preferred that a very fine grind, or powdered, salt be utilized. An acceptable such material is the one available under the tradename MORTON SALT 200 from Morton International (Morton Salt, Chicago, Ill. 60606). This material goes through a 200 USS mesh. Another usable salt material is available under the designation Morton Flour, from Morton Salt. This material is 70–240 U.S.S. mesh.

In general, ordinary table salt is not preferred. Such relatively large crystals tend not to adhere as well, when applied. This decreases the batch yield and ultimately the amount of flavoring which is delivered to the consumer (on the flakes).

In general, to provide a desirable salt flavor, at least about 100 g of salt should be applied per 1500 g popcorn.

Besides salt flavorings, a variety of alternative or additional flavorings may be utilized. For example, in many applications a preferred flavoring mixture (for many consumers) will be a butter/salt mixture. For such a mixture, the butter flavoring can be provided through the utilization of artificial butter flavors. Preferred ones are Encapsulated Starter Distillate-50X (available from Chris Hanson's Laboratories, Inc., Milwaukee, Wis. 53214), Natural Butter Flavor NF 6258 Dry, also from Chris Hanson's Laboratories, and Butter Flavor, NF5048, also from Chris Hanson's Laboratories.

In some instances it may be desirable to provide a yellow dye, to provide a desirable yellow hue to the flavored popcorn. Yellow #5, Aluminum lake or Tumeric are desirable colorants for this purpose.

Techniques according to the present invention can also be used to generate sweetened or sweet flavored popcorn flakes. One such composition is described hereinbelow. In general, preferred materials for forming sweetened flavor include the following artificial flavors:

Sunette, acesulfone potassium; from Hoechst Celanese, Edison, N.J. 08818

Aspartame 200; from Sanofi Bio-Industries, Fairfield, N.J. 07066.

Another popular flavor in popcorn is cheese flavor. A specific example for provision of a cheese flavor is provided below. In general, a cheese flavor can be accomplished through utilization of, in addition to salt and butter flavor, commercial cheese flavors such as Tastemaker Cheese flavors #308342, #308962 and #304558; Tastemaker, Cincinnati, Ohio.

A wide variety of other flavors or flavor enhancers can be used. For example, peanut flavors, yeast extracts, or similar materials are usable. Also a wide variety of spice flavors are usable, for example: herb and garlic; sour cream and onion; honey mustard; hot mustard; dry roast; barbecue; jalapeno; or Mexican. If the spices are not dry powders, so they can be dry mixed with the other flavorants/adjuvants, in general they should be supported upon a powdered base such as maltodextrin or cornstarch. For example, Tone's dry roast seasoning (T-067) from Tone's Industrial Seasonings, Des Moines, Iowa 50301.

As indicated previously, various sweet flavorings can be utilized. For example: chocolate, chocolate mint, mint, chocolate banana, vanilla, pineapple, coconut, cherry and peppermint flavorings may be provided. In many instances these materials are liquid flavors. They may be provided either in the solution including the adhesive, or in the dry powder by loading on to powder or mixing such that they are well dispersed with the dry material and do not generate a sticky mess.

Other adjuvants may be included in the dry powder mix, to be sifted onto the corn. For example, calcium chloride, which bonds upon contact with gellan gum, may be used to improve strength and speed of bonding of the components of the gum.

Immediately after the application of the dry powders, a drying process of the coated kernels should be initiated, preferably by hot air drying. The drying should be conducted to remove excess moisture (preferably to provide a moisture level no greater than about 2% by weight) and to generate a dry crisp product. Preferably the original moisture level of the popped flakes (about 1.5% by weight) is restored. Air temperatures from the heat sources used for the air drying will typically be within the range of about 200°–600° F. Relatively higher temperatures are generally preferred, so that the moisture is driven off as quickly as possible to maintain the final product quality. Drying times on the order of about 10 minutes have been used and are convenient.

D. Processing Aids

A variety of processing aids or adjuvants can be used. For example, additives which will decrease the adhesion of the popped flakes to one another may be desired. Such aids would include, for example, silicon dioxide (Zeothix 265; J. M. Huber Corp., Etowah, Tenn. and Havre de Grace, Md.).

The finely powdered or ground flavorant mix (with or without additives) and its application in a dry form to the moist popcorn flakes, provides advantage. In particular, the high surface area of dry mix helps draw the moisture, as soon as the powder is applied to the flakes. This slows, somewhat, absorption of the moisture by the popcorn flakes, and loss of crispness in the flakes.

E. Further Observations Regarding Coating of Pre-Popped Flakes

The present water-based (or aqueous-based) system for adhesion of flavorants on the pre-popped flakes is believed desirable due in part to the relatively high viscosity of the preferred tacking composition; the ratio of the weight of the tacking solution to the weight of dry ingredients (optimum ratio being approximately 2 parts tacking solution to 3 parts dry ingredients by weight), and drying at high temperatures to dry off moisture as quickly as possible to minimize the loss of surface crispness. Loss of surface crispness with exposure to water is a problem unique to pre-popped flakes, as opposed to many other snack foods or unpopped kernels. Due to the uneven surface of popcorn flakes, the amount of tacking solution cannot be readily reduced to much below the stated desired range stated without compromising adhesion of the dry flavorants (i.e. yield and flavor impact).

It is also noted that gellan gum forms a crisp film upon heating, which improves the final product quality. In general, fat replacer flavors will typically be used to improve the flavor and mouth feel of the final product.

II. Coated, Unpopped Kernels for Preparation of Flavored, Freshly Popped Popcorn Products Techniques described herein can also be used to prepare coated, unpopped kernels from which flavored, freshly popped, popcorn products can be prepared. Thus, for example, with the techniques described herein, a package of microwavable popcorn product can be prepared which, when placed in a microwave oven and appropriately exposed to microwave energy, will result in a freshly popped flavored popcorn product for the consumer.

In general, the techniques are generally analogous to those used for preparing the flavored, popped popcorn product. That is, a tacking composition or solution is applied to the kernels, and then flavoring is added as a dry powder sifted onto the kernels, with follow-up drying. However, specific methods used, and amounts applied, may be varied relative to flavoring prepopped popcorn.

A. Preferred Consumer Products Made Utilizing the Techniques Described Herein

Similarly to the disclosure of U.S. Ser. No. 08/198,892, the present techniques concern modifying microwave popcorn in such a manner that a shelf sable unpopped popcorn product is provided that can be readily popped by exposure to microwave energy, to provide a flavored popcorn with a relatively high flavor impact. The term "high flavor impact" is meant, in this context, to refer to popped kernels on which are retained a substantial amount of the flavoring provided in the original unpopped composition, as opposed to loss of the flavoring in processing or to the bottom of the package or bowl. That is, in these products a substantial portion of the flavoring is retained on the kernel, i.e., the hull remnant of the popped popcorn, and it does not fall off or become lost in packaging. The method is particularly developed so that flavoring can be provided in the absence of popping with added oil/fat. Thus, except for small amounts of oil/fat that may be contained in the flavorings themselves, the popcorn can be prepared essentially "low fat" or "fat free". In this context, the term "fat free" and similar terms is meant to characterize the fact that the methods are developed to occur without added fat or oil to facilitate popping. When the term is used, small amounts of oil/fat in the flavorings, and fat inherent in the popcorn (about 4% by weight), are disregarded.

In general, a typical consumer product would comprise a package containing microwavable popcorn, which the consumer can place in a microwave oven and, through exposure to microwave energy, pop. The flavor would be provided on the popcorn, without further operation by the consumer. That is, the consumer need only open the bag to consume the flavored popcorn. The bag need not be shaken to distribute flavor, and the flavor will generally be well adhered to the hulls of the popped popcorn. The popcorn may be popped utilizing conventional bag constructions for microwave popcorn, such as those described in U.S. Pat. Nos. 4,450,180; 4,548,826; 4,691,374; and 5,044,777, incorporated herein by reference. The arrangements described in the U.S. application assigned provisional Ser. No. 08/389,755, filed Feb. 15, 1995, incorporated herein by reference, may also be used. It was filed with the title: IMPROVED MICROWAVE COOKING CONSTRUCTION FOR POPPING CORN, with Robert H. Blamer and Denise E. Hanson identified as the inventors. It is owned by Golden Valley Microwave Foods, Inc.

While variations are possible, in a typical consumer product about 83 grams (approximately 515 kernels) of microwave popcorn are provided in a single pouch or bag construction. Such an amount of popcorn generally will pop to a volume of about 2700 to 3000 ml.

In general, flavored, unpopped, kernels made according to the present principles, similarly to kernels made according to the principles described in U.S. Ser. No. 08/198,982, demonstrate a loss of coating, for a 225 gram, coated, unpopped, popcorn sample, after prepared and when tested according to procedure such as that described herein with respect to prepopped flaking evaluation, of less than 0.4 gram, typically less than 0.2 gram. Indeed, even less than 0.05 gram losses are obtainable. In addition, the percent yield of coating which remains on the popcorn after popping, relative to the amount of coating measured on the uncoated kernels after coating and before any prepopped flaking loss, typically is at least about 60%. Figures of 65% and above readily are obtainable.

In general, a 78 gram sample of coated popcorn made according to the preferred methods described herein includes at least about 4.5 grams, typically and preferably at least 5.0 grams, and for some compositions more preferably at least 5.5 grams, of coating thereon. This corresponds, in a 225 gram sample, to at least about 13.0 grams, preferably at least 14.4 grams of coating, and for some samples more preferably at least about 15.9 grams.

It is noted that many of the preferred coatings described herein do not include any starch component. The particular manner in which the coating is conducted, using low moisture and spray techniques, allows for application of the adhesive (for example, gums) to obtain a good coating with good properties and yield, without the need for starch. The coating procedure is also observed to provide for a relatively hard crust that remains well fixed on the kernels, even during processing, and thus is advantageous.

One of the advantageous features of processing according to the present invention is an efficient utilization of the flavoring. This can be assessed by considering the amount of flavoring which winds up adhered to the unpopped corn, versus the amount of flavor provided in the dry mix that is applied to the unpopped kernels. In general, at least about 80% of the flavorant (including salt) in the dry mix can be expected to become adhered to the unpopped kernels, utilizing techniques according to the present invention. Utilization of the preferred fine grind or powdered salt described, facilitates this. Indeed, typically at least about 90% or more of the salt or other flavorant added, will be retained on the unpopped kernels after the step of applying the dry flavor and blend to the unpopped kernels, when the preferred techniques described are used.

B. The Tack or Adhesive Composition

The tack or adhesive composition for application to the kernels generally should be aqueous-based and contain, preferably in solution, the desired adhesive.

A variety of tacking agents or adhesives may be used. Materials usable as the tacking agent comprise bacterial polysaccharide gums such as gellan gum, xanthan gum, gum arabic, and cellulose gum or mixtures thereof. By "bacterial" in this context, it is meant that the gum comprises a product of a microorganism's operation on a fermentation medium. For example, gellan gum is produced by the microorganism *Pseudomonas elodea* (ATCC 31461). Xanthan gum comprises the fermentation product of *Xanthomonas campestris*. Gum arabic, also known as Gum acacia, is the dried gummy exudate from stems and branches of *Acacia senegal* (Linne), *willdenow* or other related African species of acacia. A useable cellulose gum is sodium carboxymethyl cellulose.

The presently preferred gum is gellan gum. Kelco K3B408 is a particular preferred gellan gum for utilization in coating compositions for unpopped popcorn.

TIC Gums No-Fat Snack Blend is another preferred gum for utilization in compositions for application to unpopped popcorn. In certain preferred compositions, exemplified below, mixtures of K3B408 and TIC Gums No-Fat blend will be most preferred.

In general, the solution should contain no more than an amount of moisture which is needed to provide a good distribution of the coating over the kernels, and to maintain the adhesive material in solution during application. In the case of unpopped kernels, generally less than 2%, and preferably about no more than 1.4%, of adhesive composition is applied, by weight of popcorn, typically 0.5–1.2%. Indeed, only about 1.12% of tacking solution (by weight raw kernel) is required for preferred applications. The prepopped flakes discussed above, on the other hand, generally required at least about 4–6% tacking solution (by weight of popped flakes) to get preferred spread and adhesion to the uneven surfaces of the flakes (a preferred level being about 5.36%).

Preferably, the adhesive composition contains about 0.05–15%, by weight, adhesive. When the adhesive is gellan gum, preferably the solution contains about 0.05–1.0% by weight. When it is the TIC Gums No-Fat material, it is preferably 9–15% by weight.

C. Flavorant and Adjuvants

As with the techniques described hereinabove for prepopped popcorn, in preferred processing flavorants and adjuvants are added as a dry mix, sifted onto the kernels. The various flavorants described with respect to coating prepopped popcorn, may be used. Preferred compositions, for providing a salt/butter flavor, are described hereinbelow, in an example.

In general, it is again desired that the flavorants be provided in powdered or finely ground form, or supported on a powder or fine grind base, to achieve 50–250 U.S. standard mesh. Some flavorants can be provided in the solution containing the adhesive, provide they are in a form that does not interfere with the application process (typically by misting). Thus, preferably any such flavorants that are provided, are provided dissolved in solution.

One adjuvant found useful in connection with applications according to the present invention, to unpopped kernels, is silicon dioxide ($SiO_2$). A commercially available silicon dioxide additive useable is Zeothix 265. In general, the silicon dioxide is observed to keep kernels for adhering to one another.

In general, the flavorants should be mixed dry for application by sifting, in a manner similar to the techniques described above with respect to the prepopped popcorn. A flavorant sift of about 70–250 U.S. standard mesh will be preferred.

D. Application of the Tacking or Adhesive Solution to the Kernels

Preferably the tacking or adhesive solution is applied to the unpopped popcorn kernels in a manner that ensures even and thorough coating. A variety of application techniques may be used, for example, spraying, ladling, etc. In general, for application by spraying, which is preferred, what is required is a spraying arm with several nozzles, directed to apply the composition to kernels in a pan-type coater. It is not required that the spray or mist be as fine as is preferred for coating prepopped flakes.

In preferred processes, the kernels are rotated in a pan-type coater while the spray is applied. The spray should be applied over about a one to three minute time frame (preferably 1.5 to 2.0 minutes).

E. Application of the Flavoring Sift and Drying

The flavoring is sifted onto the wet kernels after the mist has been applied thereto, and while the kernels are tumbled in the coater. The tumbling should be conducted until the powder is distributed substantially evenly.

Timing of drying is less critical than with popped flakes, because kernels do not readily absorb water. However, in general, the excess moisture will be dried from the coated kernels immediately after application of the dry mix. The drying should preferably be conducted until a moisture level of between about 11% and 13% is obtained (i.e. the preferred moisture level of raw, uncoated, unpopped popcorn kernels). Air temperatures from the heat source ranging from about 160° to 200° F. (forced heated air) will be preferred. Dry cycle times on the order of about 3 to 16 minutes per 630 lb batch (typically containing about 5 to 8 lbs of tacking solution) will be preferred.

Although unpopped kernels are not as susceptible to moisture damage as are popped kernels, in general it is desirable to apply as little moisture as is reasonably possible, in accomplishing the coating with the adhesive material. A reason for this is that less energy well be needed to drive off the moisture during the drying processes.

Thus, in general, as with the application of the prepopped popcorn, the following three factors will typically be most controlling, in defining processes which are preferred.

1. The amount of water (or adhesive composition) applied per weight of popcorn, in conducting the initial coating.
2. The amount of adhesive applied per weight of popcorn, to achieve the desired level of adhesiveness; i.e. achievement of an effective a mount of adhesive.
3. The rate of drying, to achieve a residual coating with a flavorant secured thereto.

In addition, to have desirable handling characteristics, it is preferred that the unpopped kernels be provided in a form such that they do not stick to one another during the processing, and so that they can be processed and handled without individual kernels knocking off substantial amounts of flavorant or coating, by bumping into one another. A factor of some significance with respect to this, is the fineness of the dry flavoring powder applied to the kernels, and the amount applied per weight of kernel. In general, it has been observed that the coated kernels, of preferred products, comprise about 6.7% by weight coating.

For a salt-flavored formula, preferably at least about 2 gram of salt are applied per 100 gram of unpopped kernels.

EXPERIMENTAL

In the examples, footnotes are used to identify information about the various ingredients. Throughout the Experiments, these footnotes have the following meanings:

[1] Spectrum Chemical, granular FCC (CA 138), Gardena, Calif.

[2] Less than 200 U.S.S mesh screen; Morton Salt, Chicago, Ill. 60606.

[3] 70–240 U.S.S. mesh screen; Morton Salt, Chicago, Ill. 60606.

[4] Chris Hanson's Laboratories, Milwaukee, Wis. 53214

[5] Tastemaker, Cincinnati, Ohio 45216

[6] Warner Jenkinson Co., St. Louis, Mo. 63178-4538

[7] Chris Hanson's Laboratories, Milwaukee, Wis. 53214

[8] Tastemaker, Cincinnati, Ohio 45216

[9] Tastemaker, Cincinnati, Ohio 45216

[10] 70–240 U.S.S. mesh screen; Morton Salt, Chicago, Ill. 60606

[11] Hoechst Celanese, Somerset, N.J. 08873

[12] Sanofi Bio-Industries, Inc., Fairfield, N.J. 07006

[13] 70–240 U.S.S. mesh screen; Morton Salt, Chicago, Ill. 60606

[14] Chris Hanson's Laboratories, Milwaukee, Wis. 53214

[15] McCormick Flavor Division, Hunt Valley, Md. 21031

[16] BBA Brown Sugar #35143; Bush Boake Allen, Inc., Chicago, Ill. 60618-9131

[17] Tastemaker, Cincinnati, Ohio 45216

[18] Tastemaker, Cincinnati, Ohio 45216

[19] Zeothix 265, J. M. Huber Corp., Etowah, Tenn. and Havre de Grace, Md.

[20] Grain Processing Corp., Muscatine, Iowa 52761

[21] Bush Boake Allen, Inc., Chicago, Ill. 60618-9931

EXPERIMENT 1

Preparation of a Butter Flavor, Prepopped Popcorn 3.5 lbs. of popped flakes 85 grams of a K3B408 gellan gum—1% solution, as a tacking agent (i.e. 83 grams of an aqueous solution of 1% K3B408 by weight)

| Blend of dry flavorant, coloring and salts | |
| --- | --- |
| Ingredient | Quantity (grams) |
| Calcium chloride[1] | 0.75 |
| Salt - Morton 200[2] | 25.00 |
| Salt - Morton Flour[3] | 77.22 |
| Encap. Starter Distillate - 50X[4] | 9.32 |
| Natural Butter Flavor[5] | 13.05 |
| Yellow #5, alum. lake[6] | 4.66 |
| Butter Flavor, NF[7] | 20.00 |
| | 150.00 grams |

The 3.5 lb of popped flakes were obtained using a hot air popper. Before the coating step was conducted, the flakes were sifted to remove fine particulates.

The adhesive composition comprised a 1% solution containing 85 g of K3B408 gellan gum, in water.

The popped flakes were placed in the rotatable drum of a pan-type coater. A fine mist was created from the gellan gum solution by a Wagner Heavy Duty paint sprayer set at finest setting. It was applied over the popped flakes, while the drum was rotated to ensure a substantially even coating.

The blend of dry flavorant was prepared. Immediately after the adhesive composition was applied to the popped kernels, the dry flavorant was sifted thereon using a common household sifter. During the sifting, the kernels were rotated to ensure even coverage. The dry flavorant mix was applied over a period of about 1 minute at ambient temperatures.

Immediately after the dry flavor was applied, the flakes were dried by with a Varitemp heat gun set at 600° F. (Master Appliance Corp., Racine, Wis. 53403). The product had an acceptable taste and texture for a consumer snack food.

EXPERIMENT 2

Cheese Flavor, Prepopped Popcorn

The same procedure as described in Experiment 1 was used. The components were as follows.

3.5 lbs. of popped flakes 40 grams of a K3B408 gellan gum—1% aqueous solution, plus 40 grams of a TIC Gums No Fat Snack Blend—9% aqueous solution as a tacking agent (The two 40 gram solutions were applied one right after the other.)

| Blend of dry flavorant, coloring and salts | |
| --- | --- |
| Ingredient | Quantity (grams) |
| Calcium chloride[1] | 0.39 |
| Salt - Morton 200[2] | 30.93 |
| Salt - Morton Flour[3] | 50.00 |
| Encap. Starter Distillate - 50X[4] | 2.58 |
| Cheese Flavor, Buttery[8] | 12.89 |
| Yellow #6, alum. lake[6] | 3.22 |
| Cheese Flavor[9] | 30.00 |
| | 130.00 grams |

The product has an acceptable taste and texture for a consumer snack food.

EXPERIMENT 3

Sweetened, Prepopped Popcorn

The same procedure as for Experiment 1 was used. The components were as follows.

3.5 lbs. of popped flakes 85 grams of K3B408 gellan gum—1% solution, tacking agent

| Blend of dry flavorant, coloring and salts | |
| --- | --- |
| Ingredient | Quantity (grams) |
| Calcium chloride[1] | 0.80 |
| Salt - Morton 200[2] | 6.35 |
| Maltodextrin (M040)[10] | 79.38 |
| Sunette, acesulfone K[11] | 0.45 |
| Sanofi, aspartame 200[12] | 0.45 |
| Vanilla[13] | 3.18 |
| Color, brown lake[14] | 3.00 |
| Caramel flavor[15] | 30.00 |
| Brown sugar flavor[16] | 2.00 |
| Vanilla cream flavor[17] | 2.00 |
| | 127.61 grams |

The product had an acceptable flavor and texture for a consumer snack food. However, it is noted that this formulation does not provide for a candy glaze or coating appearance that is common in sweet popcorn products.

EXPERIMENT 4

Provision of Flavor-Containing Coating on Unpopped Kernels for Microwave Popping For this experiment the tackifying composition comprised 5 lbs of an aqueous based mixture containing 0.7% by weight Kelco gel K3B408. This tackifying composition was added to 600 lb. raw kernels, in a pan-type coater over a period of 1–2 minutes.

The dry blend comprised 21 lb. Morton Salt 200 (in an alternate, 16 lb of Morton Salt 200 were used) with 4.6 lb of a mixture containing: 1 lb. Tastemaker Peanut Flavor 307777; 3 lb. Tastemaker Corn Flavor 316176; and 0.6 lb. Chris Hanson's Encapsulated Starter Distillate 50X. The dry blend was sifted onto the kernels, immediately after the tackifying composition had been applied thereto. The mixture was rotated for 1.5–2.0 minutes to evenly disperse the dry ingredients. The application was done in a pan-type coater at ambient temperatures (60°–80° F).

After the dry blend was applied, the air drying system was started to dry off the excess moisture (5–15 minutes at 160°–200° F). The coated kernels were dried down to a 11.5–13% moisture content, by weight.

Both formulations provided a material that, when popped, had an acceptable flavor and texture for a consumer product.

EXPERIMENT 5

Provision of Flavor-Containing Coating on Unpopped Kernels for Microwave Popping The same procedure as for Experiment 4 was used. The components were as follows.

| Ingredient | Quantity |
| --- | --- |
| Raw popcorn | 600.00 lbs |
| Tacking solution (0.7% solution of K3B408) (Alternatively 9–12% solution of TIC No Fat Snack blend could be used.) | 7.00 lbs |
| Dry blend: | |
| Morton salt 200[2] (22.5 lbs are generally preferred.) | 25.00 lbs |
| Encap. Starter Distillate - 50X[4] | 5.17 lbs |
| Tastemaker #264904 - Butter Flavor[18] | 1.59 lbs |
| Silicon dioxide[19] | 200.00 grams |

The resulting product was a material which, when popped, had an acceptable flavor and texture for a consumer product.

EXPERIMENT 6

Provision of Flavor-Containing Coating on Unpopped Kernels for Microwave—Sweet Version The following formulation, it is believed, would provide for a material that could be popped to an acceptable sweet popcorn product. A procedure similar to Experiment 4 could be used.

| Ingredient | Quantity |
| --- | --- |
| Raw popcorn | 600.00 lbs |
| Tacking solution (0.7% solution of K3B408) (Alternatively a 9–14 12% solution of TIC No-Fat Snack blend could be used) | 4.00 lbs |
| DRY BLEND: | |
| Calcium Chloride | 0.05 lbs |
| BBA Butterscotch Flv. #41025[21] | 3.0 lbs |
| BBA Brown sugar #35143[16] | 0.5 lbs |
| Chris Hanson's Encapsulated Starter Distillate 50X | 0.7 lbs |
| Maltodextrin (M-10 Maltrin)[20] | 0.5 lbs |
| Silicon dioxide (Zeothix 265) | 200.0 grams |

EXPERIMENT 7

Prepopped Flaking

Herein the term "pre-popped flaking" is used to refer to the amount of coating likely to be lost during handling, but prior to popping.

The equipment used is as follows:

1. Tumbler plus stainless steel canister (INDCO tumbler No. RM101;, INDCO, INC., New Albany, Ind.) (115 V; 60 HZ; 0.54 amp.).
2. Balance (accurate to 0.01 amp).
3. Timer.

In general, the procedure used for the assessment of the coating was as follows:

An approximately 225 gram sample of the coated unpopped popcorn to be assessed was isolated and weighed, to 0.01 gram (INITIAL WT). The sample was poured into the tumbler canister (depth 10 cm.; diameter 8.5 cm.). The canister was rotated (about a generally horizontal axis) in the tumbler for one hour at ambient temperature (or revolutions per minute—rpm). The entire contents of the tumbler canister were poured onto a No. 12 sieve. Any residue that may have fallen off the corn in the tumbler was collected. The sieve was tapped 50 times by hand (about a 1 inch, gentle, tap), to ensure that all loose flaking was separated from the kernels. The kernels of coated corn were then weighed (FINAL WT). The difference (Pre-Popped Flaking) reflected the amount of flaking, or loss of coating, before or during the tumbling but prior to popping. Greater amounts of flaking or loss are reflective of a less desirable product, since the coating would have a greater propensity to flake off the kernel during processing, packaging the corn, or in handling prior to popping.

Results for the tests are reported in Table I below. Sample preparation is described hereinbelow.

TABLE I

| Sample | Initial Wt. (g) | Final Wt. (g) | Pre-Pop Flaking (g) |
| --- | --- | --- | --- |
| 1 | 225.04 | 225.04 | 0.00 |
| 2 | 224.96 | 224.96 | 0.00 |
| 3 | 224.95 | 224.95 | 0.00 |
| 4 | 224.01 | 224.99 | 0.02 |

Sample ID

Samples 1 and 2 were made according to the process of Experiment 4 except using: 6.0 lbs of 9.0% TIC Gum No-Fat snack blend as the adhesive; and, a dry mix of lbs of Morton Salt 200, 5.17 lbs of Encapsulated Starter Distillate-50X, and 1.59 lbs of Butter Flavor #264904, as the dry blend.

Samples 3 and 4 were made according to the process of Experiment 4 except using: 6.0 lbs of 0.8% K3B408 solution as the adhesive; and, a dry mix of 25 lbs of Morton Salt 200, 5.17 lbs. of Encapsulated Starter Distillate-50X and 1.59 lbs of Butter Flavor #264904 as the dry blend.

EXPERIMENT 9

Evaluation of Amount of Coating Put on Unpopped Kernels by Each Process

In order to determine a percentage coating retention, it is necessary to evaluate how much coating is initially applied to each sample. This was done by washing down each sample with a washdown method described below. For the experiment, 78 gram samples of coated popcorn material were used.

The Washdown Method

Equipment:

Electronic Sale

Moisture Analyzer (Computrac Max. 50; from Arizona Instruments, Inc. of Phoenix, Ariz.)

Mill (Cemotec 1090 Sample Mill, Manufactured by Tectator, Hoganes, Sweden; obtained from Fisher Scientific)

2–500 ml Erlenmeyer flasks

Sieve (No. 12—1.70 MM)

Heat gun (Master Appliance Corp., Racine, Wis. 53403)

For each formulation evaluated, two 78 gram samples of the coated popcorn were collected and isolated. For each 78 gram sample, a measurement of the amount of coating by the washdown technique was used. Also a measurement of the amount of moisture on uncoated corn was made. Moisture measurements were made by grinding a small portion of sample in the mill, at the finest grind setting, and then analyzing in the moisture analyzer. This was done on raw corn and also on samples after washing and drying.

The procedure was as follows:

1. Weigh out two 78 gram samples of the selected formulation of coated corn to be evaluated. Record the weight (in grams) of the samples to the hundredths place.
2. Determine moisture level of raw (uncoated) corn, with moisture analyzer.
3. Pour each coated corn sample into separate 500 ml flasks.
4. Pour 200 gram of tap water (100° F.+/−3° F.) over each of the samples of coated corn in the flasks, and swirl for 3 minutes.
5. Pour each washed sample into a No. 12 sieve that will retain the kernels. Gently tap the sieve 10 times, to remove excess moisture. Pour onto a tray to dry.
6. Dry with a hand held heat gun for approximately 2 minutes, keeping the air temperature over the corn at about 100°–115° F. Shake the tray to keep the kernels rolling onto different sides during the drying. It is important not to overdry the corn. Continue drying should be conducted at about 90° F. for about 20 minutes. At that time, the moisture content of the washed sample will be about the same as the moisture content of the raw corn. This was confirmed with the analyzer.
7. The amount of coating is determined by subtracting the initial weight of sample (weight to the hundredths) from the wash/dried weight of the same sample.

The formulations evaluated were as follows:
Sample 1: As stated above for Sample 1 in TABLE I.
Sample 2: As stated above for Sample 2 in TABLE I.
Sample 3: As stated above for Sample 3 in TABLE I.
Sample 4: As stated above for Sample 4 in TABLE I.
The data is reported in Table II.

TABLE II

| Sample | Wt. of Coating in 78 g Sample |
|---|---|
| 1 | 5.64 g |
| 2 | 5.60 g |
| 3 | 5.48 g |
| 4 | 5.28 g |

TABLE III

Subtract amount of pre-popped flaking that occurs after preparation and one hour of tumbling (from Table I)

| Sample | Wt. Coating − Pre-Popped Flaking (per 78 g Sample) |
|---|---|
| 1 | 5.64 − 0.00 = 5.64 |
| 2 | 5.60 − 0.00 = 5.60 |
| 3 | 5.48 − 0.00 = 5.48 |
| 4 | 5.28 − 0.01[1] = 5.27 |

[1]The value of 0.01 was obtained by adjusting the value of 0.02 obtained for a 225 g sample to the amount of loss which would occur for a 78 gram sample - i.e., (78/225) × 0.02 − .007 (rounded to .01).

EXPERIMENT 10

Post-Popped Flaking and Final Yield

To evaluate final yield on the popcorn as it would be when consumed, each sample was popped, and the amount of post-popped flaking was measured. Herein the term "post-popped flaking" refers to the amount of coating loss which occurs during popping and not during pre-popped handling. For the post-popping flaking test, three samples for each formulation were used and the values were averaged. Two of the samples used for each formulation were the two samples from the pre-popped flaking test described above. That is, they were the two samples evaluated for pre-popped flaking loss. The third sample in each instance was a sample from the same formulation that had not been evaluated for pre-popped flaking according to the procedure above. The data is reported in Table IV.

In each instance, for the post-popped flaking, the approximately 78 gram sample was placed in an 11.25 inch popping bag, and popped for 2 minutes 25 seconds in a Kenmore microwave oven. No oil/fat or other additives were used. The popped volume was determined, for each sample, by putting the popcorn into a 4000 ml graduated cylinder and gently shaking to level the material.

TABLE IV

Values from TABLE III minus amount of post-popped flaking that occurs after popping, i.e., amount of coating remaining after popping

| Sample | Amount of Coating Remaining After Popping (per 78 g Sample) |
|---|---|
| A | 5.61[1] − 1.23[2] = 4.39 g |
| B | 5.38[3] − 1.30[4] = 4.08 g |

[1]The value of 5.62 is the average of 5.64 and 5.60, ie., samples 1 and 2 above.
[2]The value of 1.23 is an average of 3 value (1.30, 1.23 and 1.17).
[3]The value of 5.38 is an average of 5.48 and 5.27, the two values obtained for samples 3 and 4 above, i.e, made according to samples 3 and 4.
[4]The value of 1.30 is the average value of three figures (1.37, 1.20 and 1.33).

With respect to Sample A, of the three values averaged, the first two (1.30 and 1.23) were values for the samples that had been subjected to the pre-popped flaking test. The third value (1.17) was measured from material made in the same batch, but not tested for pre-popped flaking. The popped volumes for the three samples were 2850, 2700 and 2775, respectively.

With respect to Sample B, of the three values averaged for pre-popped flaking, the first two (1.37 g and 1.20 g) were for the materials tested for pre-popped flaking. The third value averaged (1.33 g) was for a sample of the same material which had not been subjected to the pre-popped flaking evaluation. The popped volumes for the three samples were 2750, 2800 and 2850, respectively.

TABLE V

AVERAGE PERCENT OF COATING RETENTION (YIELD)
(amount of coating on final popcorn)
÷
(Amount inititially present on unpopped kernels)

| Sample | Percentage |
|---|---|
| A | 78.1% |
| B | 75.7% |

What is claimed is:

1. A method for applying a flavoring composition to popped popcorn; said method including the steps of:

(a) applying an aqueous-based adhesive composition onto popped popcorn; said aqueous-based adhesive composition including a flavoring adhesive effective amount of adhesive agent; and having no added fat or oil therein; and (b) after said step of applying, applying dry flavorant composition onto the popped popcorn; and (c) drying excess moisture from the popped popcorn.

2. A method according to claim 1 wherein:

(a) said step of applying adhesive composition comprises applying the aqueous-based adhesive composition as a fine mist.

3. A method according to claim 2 wherein:

(a) said step of spraying comprises applying a adhesive composition containing about 0.5–15% by weight adhesive.

4. A method according to claim 3 wherein:

(a) said step of spraying comprises applying about 1–10% by weight adhesive composition, per weight of popped popcorn.

5. A method according to claim 4 wherein:

(a) said step of applying dry flavorant composition comprises applying a dry composition of 50–250 mesh U.S. Standard.

6. A method according to claim 5 wherein:

(a) said dry flavorant composition includes salt as a flavorant; and (b) said step of applying dry flavorant composition includes applying at least 100 g of salt per 1500 g of popped popcorn.

7. A method according to claim 1 wherein:

(a) said step of drying is conducted to achieve a moisture level of no greater than about 2% by weight.

8. A popcorn product comprising the result of:

(a) spraying an aqueous-based adhesive composition onto popped popcorn; said aqueous-based adhesive composition including a flavoring adhesive effective amount of adhesive agent; and having no added fat or oil therein; and (b) after said step of spraying, applying dry flavorant composition onto the popped popcorn; and (c) drying excess moisture from the popped popcorn.

* * * * *